US008763980B2

(12) United States Patent
Deslatte

(10) Patent No.: US 8,763,980 B2
(45) Date of Patent: Jul. 1, 2014

(54) POST BRACKET AND POST SUPPORT STRUCTURE INCORPORATING THE SAME

(76) Inventor: Curtis J. Deslatte, St. Helens, OR (US)

(*) Notice: Subject to any disclaimer, the term of this patent is extended or adjusted under 35 U.S.C. 154(b) by 0 days.

(21) Appl. No.: 12/704,398

(22) Filed: Feb. 11, 2010

(65) Prior Publication Data

US 2011/0192943 A1    Aug. 11, 2011

(51) Int. Cl.
    *A45B 25/28* (2006.01)
(52) U.S. Cl.
    USPC .................... 248/539; 248/218.4; 52/703
(58) Field of Classification Search
    USPC ............ 248/534, 539, 218.4, 300; 52/745.21, 52/703
    See application file for complete search history.

(56) References Cited

U.S. PATENT DOCUMENTS

| 466,960 A | 1/1892 | Widmayer |
| 1,025,904 A | 5/1912 | Earhart |
| 1,198,840 A | 9/1916 | Hanck et al. |
| 1,297,838 A | 3/1919 | Haines |
| 1,745,814 A * | 2/1930 | Sadler ............................ 248/540 |
| D112,555 S * | 12/1938 | Lowen ............................ D8/371 |
| 2,174,140 A | 9/1939 | Schofield |
| 2,543,900 A * | 3/1951 | Dudley et al. ................. 248/539 |
| 2,626,770 A * | 1/1953 | Norman ......................... 248/534 |
| 3,164,343 A * | 1/1965 | Cucullo ......................... 248/27.8 |
| 3,890,751 A | 6/1975 | Caputo et al. |
| 3,901,481 A * | 8/1975 | Probst ............................ 256/59 |
| 4,815,687 A * | 3/1989 | Selke et al. ................... 248/230.1 |
| 4,863,137 A | 9/1989 | Cockman et al. |
| 4,943,023 A * | 7/1990 | Becker ........................... 248/302 |
| 4,964,619 A | 10/1990 | Glidden, Jr. |
| 5,011,107 A | 4/1991 | Reece |
| 5,123,623 A | 6/1992 | McNamara |
| 5,143,472 A | 9/1992 | Reed et al. |
| 5,203,817 A | 4/1993 | Klumpjan |
| 5,568,909 A | 10/1996 | Timko |
| 5,586,423 A | 12/1996 | Mullen |
| 5,636,482 A | 6/1997 | Klager |
| 6,015,139 A | 1/2000 | Weber |
| 6,053,281 A | 4/2000 | Murray |
| 6,328,285 B1 | 12/2001 | Wiseman |
| 6,336,620 B1 | 1/2002 | Belli |
| 6,467,230 B1 | 10/2002 | Perkins et al. |
| 6,547,197 B2 * | 4/2003 | Kempf et al. ................. 248/218.4 |
| 6,676,094 B1 * | 1/2004 | Brown ........................... 248/214 |
| 6,758,448 B1 | 7/2004 | Williams et al. |
| 6,848,679 B2 | 2/2005 | Higgs et al. |
| 6,886,296 B1 | 5/2005 | John et al. |
| 6,948,877 B1 * | 9/2005 | Lo .................................. 403/108 |
| 7,712,283 B2 * | 5/2010 | Gadd et al. ..................... 52/713 |
| 7,905,060 B2 * | 3/2011 | Brunner ........................... 52/8 |
| 2003/0140588 A1 * | 7/2003 | Sucato, Jr. .................. 52/506.01 |
| 2003/0217526 A1 | 11/2003 | Larson |
| 2004/0000115 A1 | 1/2004 | Cox |
| 2004/0256528 A1 * | 12/2004 | Sanatgar et al. ............... 248/300 |
| 2005/0016085 A1 | 1/2005 | Saldarelli et al. |
| 2005/0214066 A1 * | 9/2005 | Lo .................................. 403/108 |

(Continued)

*Primary Examiner* — Bradley Duckworth
(74) *Attorney, Agent, or Firm* — Marger, Johnson & McCollom, P.C.

(57) ABSTRACT

A post bracket includes a mounting portion, a first flange portion, and a first post support portion. The mounting portion includes a first edge and a second edge opposite the first edge. The first flange portion is disposed at the first edge of the mounting portion and is configured to extend along a side surface of a block. The first post support portion is disposed at the second edge of the mounting portion and is configured to be fastened to a post.

8 Claims, 9 Drawing Sheets

(56) References Cited

U.S. PATENT DOCUMENTS

| | | |
|---|---|---|
| 2005/0252124 A1 | 11/2005 | Bergman |
| 2007/0023588 A1 | 2/2007 | Symons |
| 2008/0277543 A1 | 11/2008 | Daysh et al. |
| 2008/0295383 A1* | 12/2008 | Wakefield et al. ............ 43/21.2 |
| 2009/0025312 A1* | 1/2009 | Deans et al. ................. 52/167.3 |
| 2009/0173036 A1* | 7/2009 | Hand .............................. 52/715 |
| 2009/0173844 A1* | 7/2009 | Huo ............................... 248/65 |
| 2011/0072751 A1* | 3/2011 | Clear et al. ..................... 52/415 |

\* cited by examiner

POST BRACKET AND POST SUPPORT STRUCTURE INCORPORATING THE SAME

BACKGROUND

1. Technical Field

This disclosure relates generally to post brackets and post support structures incorporating the same. More specifically, this disclosure relates to post brackets having a post support portion configured to be fastened to a post and a flange portion configured to extend along a side surface of a block, and to post support structures including a block and a post bracket.

2. Description of the Related Art

Ground or earth anchors have been used to anchor structures such as posts firmly to the ground. Some ground anchors are designed to be manually embedded into the soil while others are designed to be mechanically embedded by the use of power tools. Once posts are anchored to the ground, it is often difficult to move or remove the posts from their anchored position. Also, installing such ground anchors is often a labor intensive and time consuming process requiring holes to be dug and concrete to be poured and cured. Temporary anchors are known to exist, but often provide less than adequate support for the posts and other structures attached to them.

Exemplary embodiments of the present invention address problems such as those described above.

DETAILED DESCRIPTION OF THE EMBODIMENTS

Figure 1A:
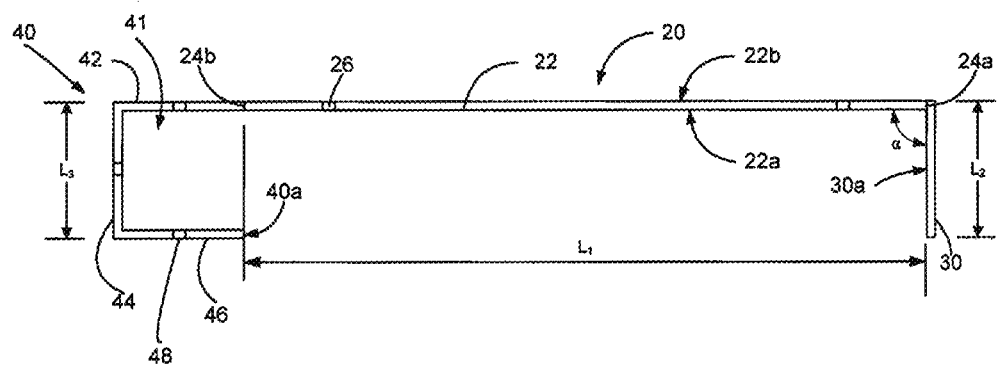
FIG. 1A illustrates a top plan view of a post bracket according to an embodiment of the invention.

Example embodiments are described below with reference to the accompanying drawings. Many different forms and embodiments are possible without deviating from the spirit and teachings of the invention and so the disclosure should not be construed as limited to the example embodiments set forth herein. Rather, these example embodiments are provided so that this disclosure will be thorough and complete, and will convey the scope of the invention to those skilled in the art. In the drawings, the sizes and relative sizes of components may be exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-section illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1B:
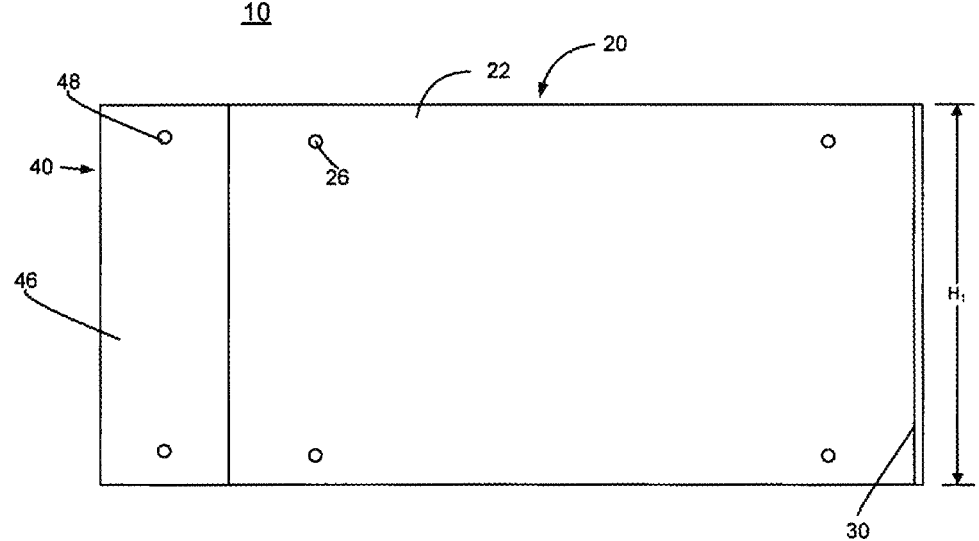
FIG. 1B illustrates a front plan view of the post bracket shown in FIG. 1A.

FIG. 1A illustrates a top plan view of a post bracket according to an embodiment of the invention. FIG. 1B illustrates a front plan view of the post bracket shown in FIG. 1A.

Referring to FIGS. 1A and 1B, a post bracket 10 can generally be characterized as including a mounting portion 20, a first flange portion 30 and a first post support portion 40. In one embodiment, the mounting portion 20, first flange portion 30 and first post support portion 40 are formed of a material such as steel and may be connected to each other in any suitable manner (e.g., by welding). In another embodiment, one or both of the first flange portion 30 and the first post support portion 40 may be integrally formed with the mounting portion 20. For example, the post bracket 10 may be formed as a single piece of metal that is bent to form the first flange portion 30 and the first post support portion 40.

The mounting portion 20, first flange portion 30 and first post support portion 40 can be generally characterized as having lengths, $L_1$, $L_2$ and $L_3$, respectively. As exemplarily illustrated, the mounting portion 20, first flange portion 30 and first post support portion 40 each have the same height, $H_1$. The height, $H_1$, may be in a range of 6 inches (or about 6 inches) to 18 inches (or about 18 inches). In other embodiments, however, the height of one or more of the mounting portion 20, first flange portion 30 and first post support portion 40 can be different from the height of any other component of the post bracket 10. As exemplarily illustrated, the lengths $L_2$ and $L_3$ of the first flange portion 30 and the first post support portion 40, respectively, are the same. In other embodiments, however, the length $L_2$ of the first flange portion 30 may be less than or greater than the length $L_3$ of the first post support portion 40. In one embodiment, the length, $L_1$, of the mounting portion 20 may be in a range of 1 foot (or about 1 foot) to 3 feet (or about 3 feet). In one embodiment, the length, $L_2$, of the first flange portion 30 may be in a range of 3 inches (or about 3 inches) to 1 foot (or about 1 foot). In one embodiment, the length, $L_3$, of the first post support portion 40 may be in a range of 3 inches (or about 3 inches) to 1 foot (or about 1 foot).

The mounting portion 20 includes a mating surface 22a, an exterior surface 22b opposite the mating surface 22a, a first edge 24a and a second edge 24b opposite the first edge 24a. The mating surface 22a and the exterior surface 22b both extend between the first edge 24a and the second edge 24b. The distance between the first edge 24a and the second edge 24b of the mounting portion 20 is fixed. As will be discussed in greater detail with respect to FIGS. 9-12, the mating surface 22a faces toward a block to which the post bracket 10 is fastened, whereas the exterior surface 22b faces away from the block. In one embodiment, one or both of the mating surface 22a and the exterior surface 22b may be coated with a suitable interface material (not shown) to minimize or reduce any damage or wear the mounting portion 20 may experience if the mating surface 22a or exterior surface 22b contacts a block. The interface material may be a material such as a polymer (e.g., polytetrafluoroethylene (PTFE)).

As exemplarily illustrated, the mating surface 22a extends between the first edge 24a and the second edge 24b substantially along a plane (e.g., a "first plane"). In another embodiment, however, the mating surface 22a can extend between the first edge 24a and the second edge 24b in a non-planar manner. For example, the mating surface 22a can define a generally concave, convex, undulating surface, or the like, or a combination thereof, extending between the first edge 24a and the second edge 24b. Further, the mating surface 22a can define a stepped surface extending between the first edge 24a and the second edge 24b.

The mounting portion 20 includes a first mounting component 22 having apertures 26 defined therein. Each aperture 26 is configured to receive a fastener (not shown) for fastening the post bracket 10 to a block. The first flange portion 30, however, includes no such apertures. In other embodiments, however, the first flange portion 30 may include at least one aperture. Although FIGS. 1A and 1B illustrate the first mounting component 22 as including four apertures 26 disposed in a rectangular arrangement, the first mounting component 22 may have any number of apertures 26 (e.g., 1, 2, 3, 4, 5, etc.) disposed in any type of arrangement.

The first flange portion 30 is disposed at the first edge 24a of the mounting portion 20. The first flange portion 30 is configured to extend along a side surface of a block (not shown). In one embodiment, the first flange portion 30 includes a mating surface 30a extending along the side surface of a block along another plane (e.g., a "second plane") that is different from the first plane. The second plane may be substantially perpendicular to the first plane (i.e., α=90 degrees). In other embodiments, the angle α between the second plane and the first plane may be acute or obtuse. In one embodiment, the mating surface 30a of the first flange portion 30 may be configured to contact the side surface of a block. Accordingly, the mating surface 30a may be coated with a suitable interface material (not shown) to minimize or reduce any damage or wear the first flange portion 30 may experience if the mating surface 30a contacts a block. The interface material may be a material such as a polymer (e.g., polytetrafluoroethylene (PTFE)). Constructed as described above, the first flange portion 30 can press against a side surface of a block to reduce any stress the block may experience due to movement of the fasteners within a block (e.g., caused by movement of a post fastened to the first post support portion 40).

The first post support portion 40 is disposed at the second edge 24b of the mounting portion 20. The first post support portion 40 is configured to be fastened to a post (not shown). In one embodiment, the first post support portion 40 is provided as a sleeve defining a post-receiving space configured to receive a post. Although FIG. 1A illustrates the post-receiving space as having a generally square or rectangular perimeter, the perimeter of the post-receiving space may be any suitable shape (e.g., triangular, hexagonal, circular, elliptical, etc., or some irregular shape). The first post support portion 40 may be configured to extend along a side surface of a block. In one embodiment, the first flange portion 30 and the first post support portion 40 are disposed at the same side of the mounting portion 20 as the mating surface 22a. As a result, each of the first post support portion 40 and the first flange portion 30 is configured to extend along a side surface of the same block. In another embodiment, however, the first flange portion 30 and the first post support portion 40 may be disposed at the same side of the mounting portion 20 as the exterior surface 22b. In one embodiment, the first post support portion 40 may include a mating surface 40a configured to contact the side surface of a block. Accordingly, the mating surface 40a may be coated with a suitable interface material (not shown) to minimize or reduce any damage or wear the first post support portion 40 may experience if the mating surface 40a contacts a block. The interface material may be a material such as a polymer (e.g., polytetrafluoroethylene (PTFE)).

As exemplarily illustrated, the sleeve of the first post support portion 40 includes a first sleeve portion 42, a second sleeve portion 44, and a third sleeve portion 46, which collectively define a post-receiving space therebetween. Although FIG. 1A illustrates the first sleeve portion 42 as adjoining the second edge 24b of the mounting portion 20, the first post support portion 40 may be rotated such that the second sleeve portion 44 or the third sleeve portion 46 adjoins the second edge 24b of the mounting portion 20. A post (not shown) received within the post-receiving space may be fastened to the first post support portion 40 by inserting fasteners (not shown) through apertures 48 and into the post. Although FIGS. 1A and 1B illustrate two apertures 48 being defined in each of the first sleeve portion 42, second sleeve portion 44 and third sleeve portion 46, any of the first sleeve portion 42, second sleeve portion 44 and third sleeve portion 46 may include more or fewer apertures 48, or no apertures at all. Although not shown, the first post support portion 40 may, in some embodiments, include an optional bottom sleeve portion extending from one or more of the first sleeve portion 42, second sleeve portion 44 and third sleeve portion 46 so that a post may rest on the bottom sleeve portion.

FIGS. 2-8 illustrate top plan views of post brackets according to some other embodiments.

Figure 2:
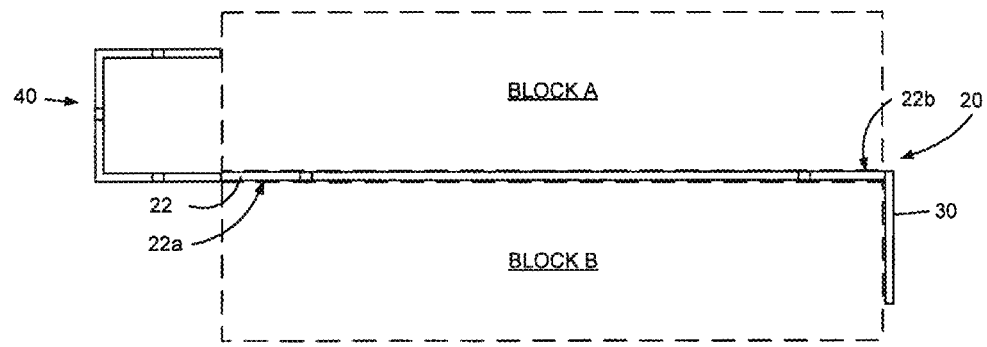
FIGS. 2-8 illustrate top plan views of post brackets according to other embodiments.

Referring to FIG. 2, a post bracket may be provided in any manner as exemplarily described above (e.g., as described with respect to FIGS. 1A and 1B), but the first flange portion 30 and the first post support portion 40 are configured to extend along a side surface of different blocks (e.g., "BLOCK A" and "BLOCK B"). Although FIG. 2 illustrates the first flange portion 30 and the first post support portion 40 as each being disposed at the same side of the mounting portion 20 as the mating surface 22a and exterior surface 22b, respectively, the first flange portion 30 and the first post support portion 40 may each be disposed at the same side of the mounting portion 20 as the exterior surface 22b and the mating surface 22a, respectively.

Figure 3:
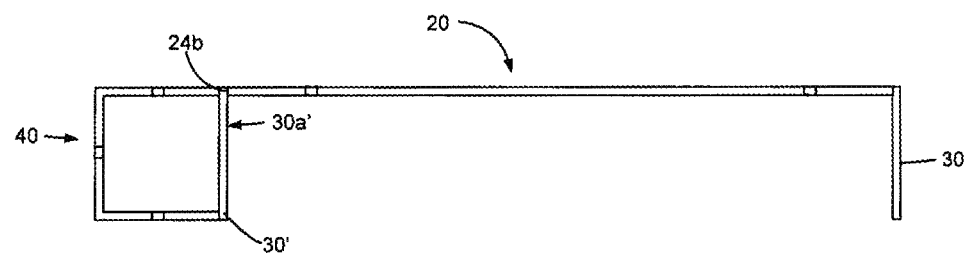

Referring to FIG. 3, a post bracket may be provided in any manner as exemplarily described above (e.g., as described with respect to FIGS. 1A and 1B), but further includes a second flange portion 30' disposed at the second edge 24b of the mounting portion 20. The second flange portion 30' may include a mating surface 30a', similar to the mating surface 30a of the first flange portion 30. In one embodiment, the second flange portion 30' is provided in the same manner as the first flange portion 30. In another embodiment, the second flange portion 30' and the first flange portion 30 are provided differently. In one embodiment, each of the first flange portion 30 and the second flange portion 30' are configured to extend along a side surface of the same block. In another embodiment, the first flange portion 30 and the second flange portion 30' are configured to extend along a side surface of different blocks.

Figure 4:
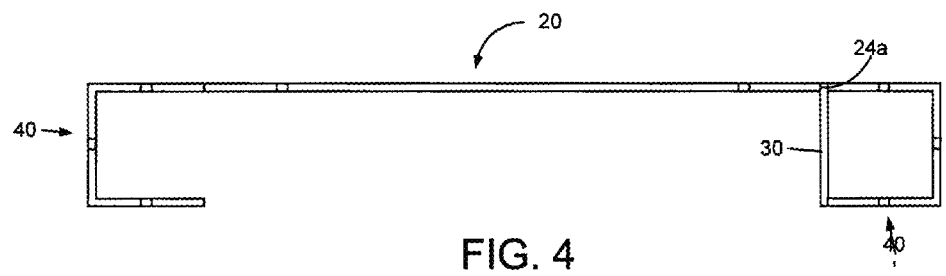

Referring to FIG. 4, a post bracket may be provided in any manner as exemplarily described above (e.g., as described with respect to FIGS. 1A and 1B), but further includes a second post support portion 40' disposed at the first edge 24a of the mounting portion 20. Generally, the second post support portion 40' is configured to be fastened to a post (not shown). As a result, the post bracket shown in FIG. 4 may be fastened to two posts. In one embodiment, the second post support portion 40' is provided in the same manner as the first post support portion 40. In another embodiment, the second post support portion 40' and the first post support portion 40 are provided differently. In one embodiment, each of the first post support portion 40 and the second post support portion 40' is configured to extend along a side surface of the same block. In another embodiment, the first post support portion 40 and the second post support portion 40' are configured to extend along a side surface of different blocks. Although the post bracket shown in FIG. 4 is provided as exemplarily described with respect to FIGS. 1A and 1B, the post bracket may be provided in any manner as exemplarily described above.

Figure 5:
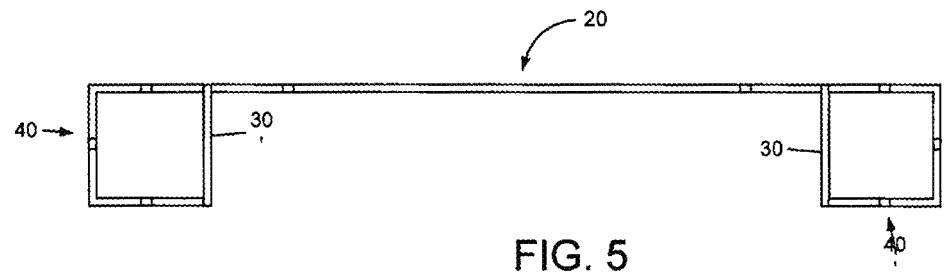
Figure 6:
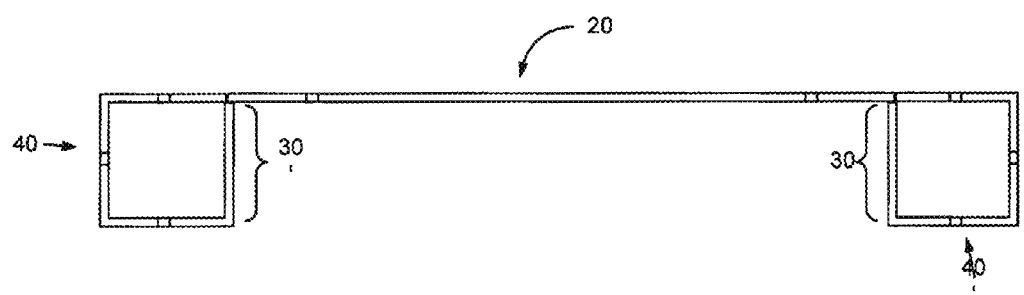

Referring to FIGS. 5 and 6, a post bracket may be provided in any manner as exemplarily described above (e.g., as described with respect to FIGS. 1A and 1B), but further includes a second flange portion 30' disposed at the second edge 24b of the mounting portion 20 and a second post support portion 40' disposed at the first edge 24a of the mounting portion 20. The second flange portion 30' may be configured as exemplarily described above with respect to FIG. 3 and the second post support portion 40' may be configured as exemplarily described above with respect to FIG. 4. The first post support portion 40 and the second flange portion 30' may be separately formed as shown in FIG. 5, or integrally formed as shown in FIG. 6. Similarly, the first flange portion 30 and the second post support portion 40' may be separately formed as shown in FIG. 5, or integrally formed as shown in FIG. 6. In one embodiment, the post bracket shown in FIG. 6 may be formed as a single piece of metal that is bent to form the integrally-formed first flange portion 30 and second post support portion 40' and the integrally-formed first flange portion 30 and second post support portion 40'.

Figure 7:
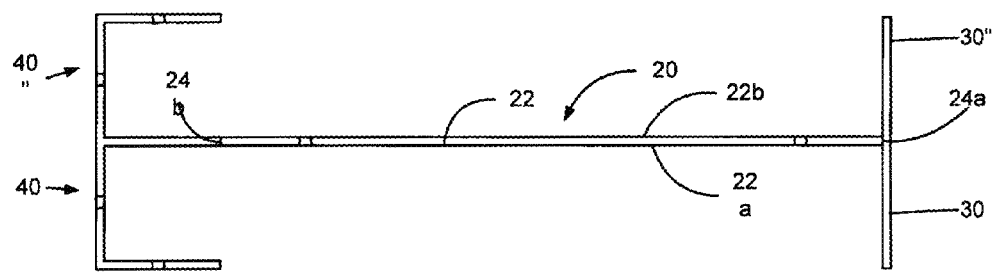
Figure 8:
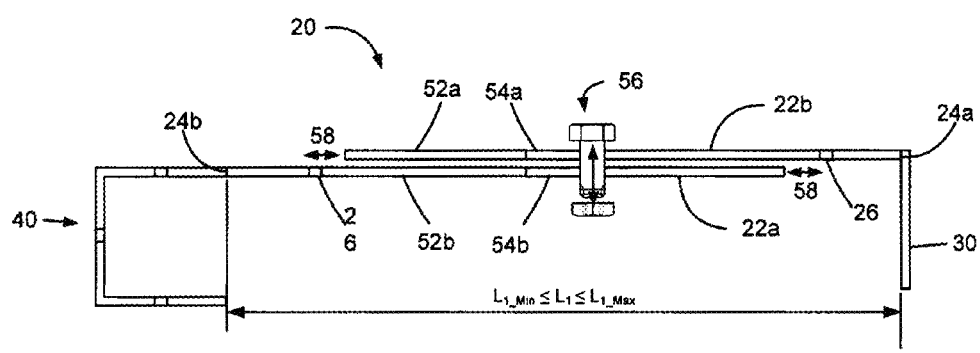

Referring to FIG. 7, a post bracket may be provided in any manner as exemplarily described above (e.g., as described with respect to FIGS. 1A and 1B), but further includes a third flange portion 30" disposed at the first edge 24a of the mounting portion 20 and a third post support portion 40" disposed at the second edge 24b of the mounting portion 20. The first flange portion 30 and the third flange portion 30" are each disposed at the same side of the mounting portion 20 as the mating surface 22a and exterior surface 22b, respectively. As a result, each of the first flange portion 30 and the third flange portion 30" are configured to extend along a side surface of different blocks. The first post support portion 40 and the third post support portion 40" are each disposed at the same side of the mounting portion 20 as the mating surface 22a and exterior surface 22b, respectively. As a result, each of the first post support portion 40 and the third post support portion 40" are configured to extend along a side surface of different blocks. Generally, the third post support portion 40" is configured to be fastened to a post (not shown). As a result, the post bracket shown in FIG. 7 may be fastened to two posts. Although the first flange portion 30 and the third flange portion 30" are illustrated as being integrally formed, it will be appreciated that the first flange portion 30 and the third flange portion 30" may be separate and distinct components. Similarly, although the first post support portion 40 and the third post support portion 40" are illustrated as being integrally formed, it will be appreciated that the first post support portion 40 and the third post support portion 40" may be separate and distinct components. Further, one or both of the third flange portion 30" and the third post support portion 40" may be a separate and distinct component from the mounting portion 20, or may be integrally formed with the mounting portion 20.

As discussed above, a post bracket according to the embodiments exemplarily described above generally includes a flange portion, a post support portion, or a combination thereof disposed at each of the first edge 24a and the second edge 24b of the mounting portion 20. In some embodiments, however, any of the post brackets exemplarily described above with respect to FIGS. 1A to 7 may be provided with one or more post support portions disposed at only one of the first edge 24a and the second edge 24b of the mounting portion 20 and not at the other of the first edge 24a and the second edge 24b. In such embodiments, the length, $L_1$, of the mounting portion 20 may be shorted as desired.

According to some embodiments, a post bracket may be provided as exemplarily described above with respect to any of FIGS. 1A to 7, but the distance between the first edge 24a and the second edge 24b of the mounting portion 20 may be adjustable. For example, with reference to FIG. 8, the mounting portion 20 of the post bracket shown in FIGS. 1A and 1B may include a first plate 52a having a first aperture 54a defined therein and a second plate 52b having a second aperture 54b defined therein. The first plate 52a may define the exterior surface 22b and the first edge 24a of the mounting portion 20 while the second plate 52b may define the mating surface 22a and the second edge 24b of the mounting portion 20.

The first plate 52a and the second plate 52b may be coupled together by a fastener 56. The fastener 56 may, for example, include a threaded bolt inserted through the first aperture 54a and the second aperture 54b from the exterior surface 22b of the mounting portion 20 and a nut threaded onto a distal end of the bolt at the mating surface 22a of the mounting portion 20. The head of the bolt (or a washer, not shown, provided between head of the bolt and the exterior surface 22b of the mounting portion 20) and the nut (or a washer, not shown, provided between nut and the mating surface 22a of the mounting portion 20), may each have a width that is greater than the width of the first aperture 54a and the second aperture 54b, respectively, so that the fastener presses the first plate 52a and the second plate 52b together when the nut is suitably threaded onto the bolt. When sufficiently pressed together, the first plate 52a is immovably coupled to the second plate 52b. In one embodiment, the length of one or more of the first aperture 54a and the second aperture 54b can be extended so that the first plate 52a can be slid relative to the second plate 52b (e.g., in a direction along arrows 58) to adjust the distance $L_1$ between the first edge 24a and the second edge 24b of the mounting portion 20. In one embodiment, adjustments to $L_1$ (i.e., $\Delta L_1$) can be as large as 6 feet (or about 6 feet) when $\Delta L_1 = L_{1\_Max} - L_{1\_Min}$. Thus, $\Delta L_1$ can have a range of greater than zero to less than or equal to ($L_{1\_Max} - L_{1\_Min}$).

Figure 9:
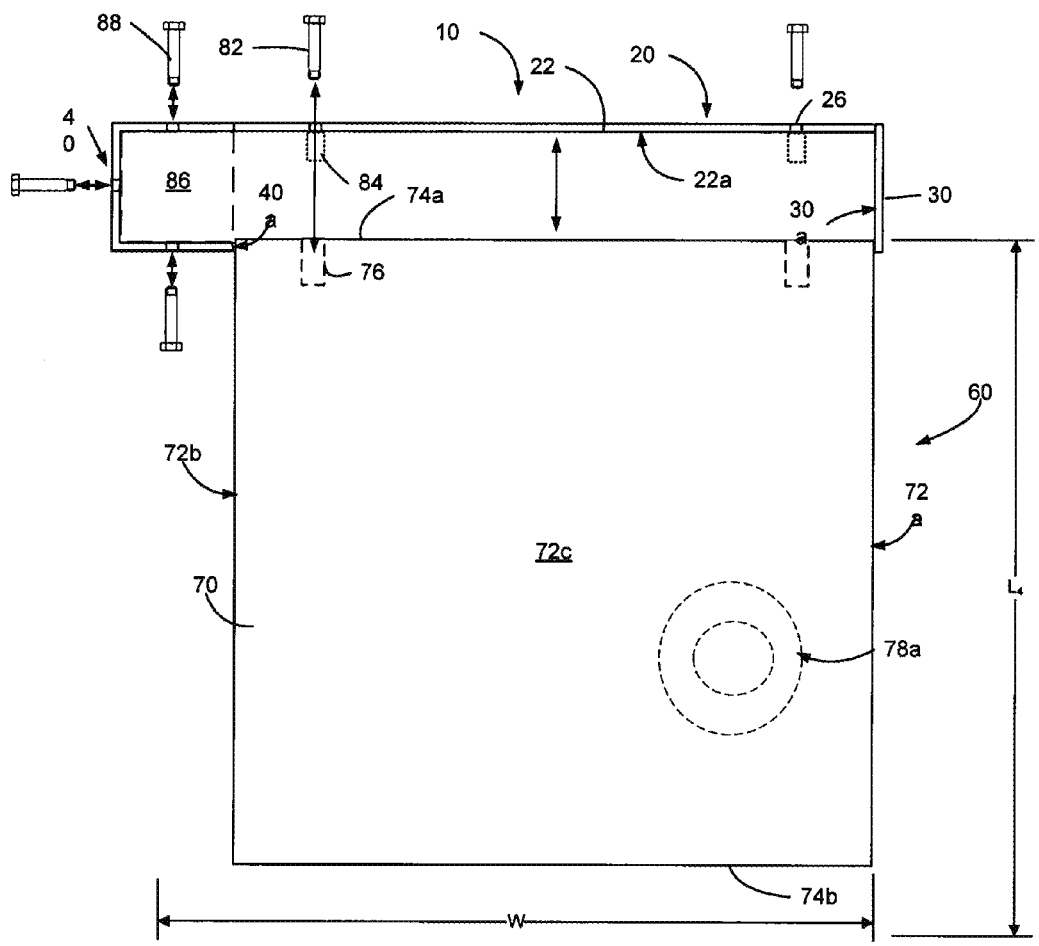
FIG. 9 illustrates a method of forming a post support structure incorporating the post bracket shown in FIG. 1, according to an embodiment.
Figure 10:
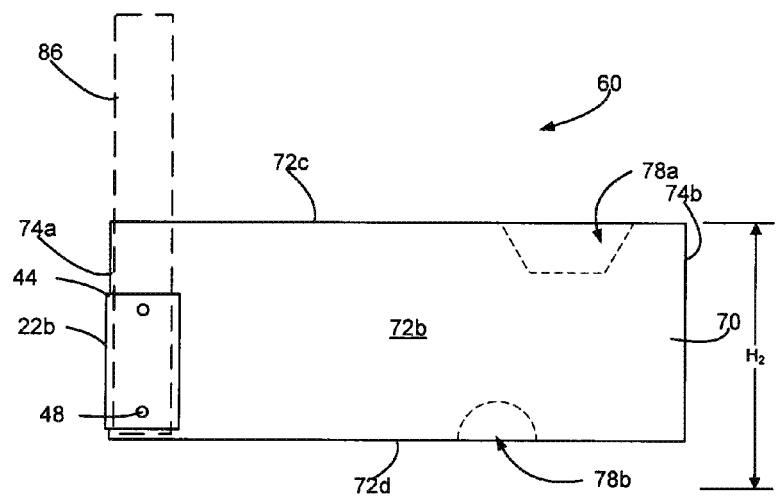
FIG. 10 illustrates a side plan view of a post support structure formed according to the method shown in FIG. 9.
Figure 11A:
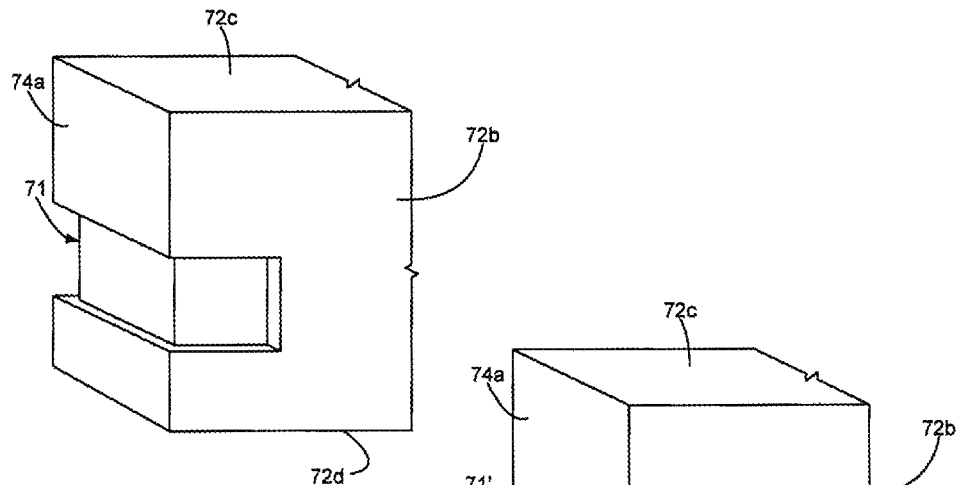
FIGS. 11A-11C illustrate a partial perspective view of the block in the post structure shown in FIGS. 9 and 10, according to embodiments of the invention.
Figure 11B:
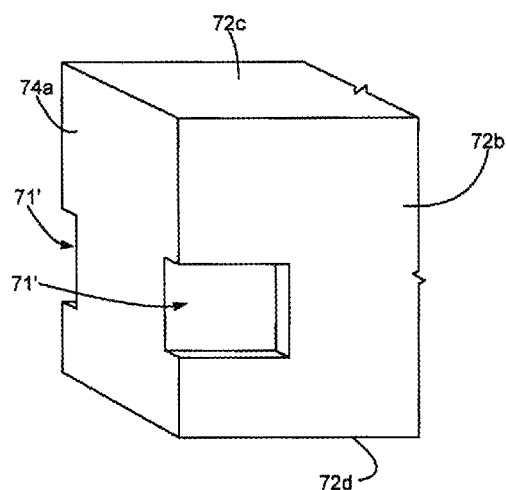
Figure 11C:
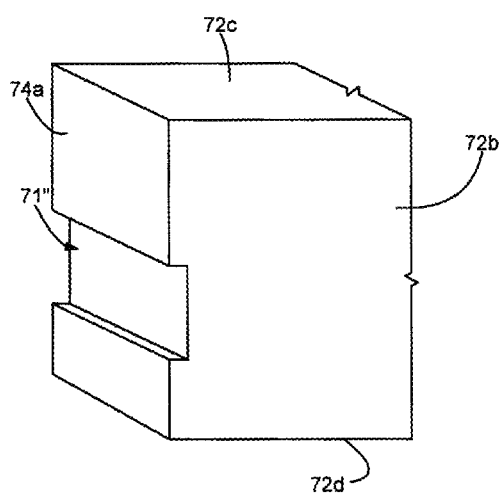

FIG. 9 illustrates a method of forming a post support structure incorporating the post bracket shown in FIG. 1, according to one embodiment. FIG. 10 illustrates a side plan view of a post support structure formed according to the method shown in FIG. 9. FIGS. 11A-11C illustrate a partial perspective view of the block in the post structure shown in FIGS. 9 and 10, according to some embodiments.

Referring to FIGS. 9 and 10 a post support structure 60 can generally be characterized as including a block 70, a post bracket 10, and fasteners fastening the post bracket 10 to the block 70. Although the post bracket 10 is shown as exemplarily described with respect to FIGS. 1A and 1B, the post bracket 10 may be provided in any manner as exemplarily described above. Constructed as exemplarily described above, the first flange portion 30 of the post bracket 10 is configured to extend along a side surface 72a of the block 70.

Generally, the block 70 is a pre-formed block, configured to provide a foundation that is sufficient to maintain a post 86 in a predetermined orientation (e.g., in an upright orientation) when the post 86 is fastened to the post bracket 10 and when the post bracket 10 is fastened to the block 70, even when the post 86 is attached to structure such as a wooden fence, a sign, a roof, or the like or the like. The block 70 may further be configured to maintain the post 86 in the predetermined orientation when the block 70 is itself not fixed to another object, but is simply resting on the ground. In one embodiment, the block 70 may be configured to be moved from one location to another location using readily-available equipment such as a forklift, a tractor, etc.

In one embodiment, the block 70 may have a length, $L_4$, in a range of 1 foot (or about 1 foot) to 10 feet (or about 10 feet), a width, W, in a range of 1 foot (or about 1 foot) to 30 inches (or about 30 inches) and a height, $H_2$, in a range of 1 foot (or about 1 foot) to 3 feet (or about 3 feet). Height $H_2$ of the block 70 may be greater than, less than, or equal to height $H_1$ of the post bracket 10. In another embodiment, the block 70 may have a weight in a range of 600 pounds (or about 600 pounds) to 9000 pounds (or about 9000 pounds). The block may be made of a material such as metal, wood, stone, concrete, or the like or a combination thereof. According to some embodiments, the block 70 may be provided as a concrete retaining wall block such as those manufactured by ULTRABLOCK, INC. of Vancouver, Wash.

As exemplarily illustrated, the block 70 is provided in a generally prismatic shape, having four planar rectangular side surfaces 72a, 72b, 72c and 72d extending between two opposing planar rectangular end surfaces 74a and 74b and a substantially straight axis extending through the end surfaces 74a and 74b. Each side surface 72a, 72b, 72c and 72d adjoins both end surfaces 74a and 74b and is disposed perpendicularly with respect both end surfaces 74a and 74b. Side surfaces 72a and 72b have the same dimensions, side surfaces 72c and 72d have the same dimensions, and end surfaces 74a and 74b have the same dimensions. In other embodiments, however, any of the side surfaces 74a, 74b, 74c and 74d or end surfaces 74a and 7b may have any shape (e.g., square, triangular, trapezoidal, zig-zag, arcuate, L-shaped, or the like or a combination thereof) and may be planar, curved, smooth, rough, or the like, or a combination thereof. Moreover, one or more of the side surfaces 74a, 74b, 74c and 74d may be disposed at acute or obtuse angles with respect to one or both of the end surfaces 74a and 74b. Further, side surfaces 72a and 72b can be dimensioned differently, as can side surfaces 72c and 72d and end surfaces 74a and 74b. Moreover, the block 70 may have more or fewer than four side surfaces. Similarly, the block 70 may have only one end surface (e.g., the block may be wedge-shaped). Although the axis of the block 70 is illustrated as substantially straight, the axis may have any configuration (e.g., be curved, zig-zagged, or the like or a combination thereof).

In one embodiment, one or more of the side surfaces 72a, 72b, 72c and 72d may be configured to provide added functionality to the block 70. For example, a recess 78a may be provided to extend into the block 70 from the side surface 72c and to retain growing media (e.g., soil) for growing plants (e.g., ground-cover, vegetables, shrubs, trees, etc.). One or more drainage outlets (not shown) may be provided within the block 70 allowing excess water to be removed from the recess 78a and away from the block 70, as is known in the art. In one embodiment, the recess 78a and the one or more drainage outlets may be formed during casting of the block 70. In another embodiment, one or both of the recess 78a and the one or more drainage outlets may be formed after the block 70 is formed (e.g., by cutting or grinding the block 70). Although only one recess 78a is shown, any number of recesses, having any desired dimension, may also be provided. In another example, a groove 78b may be provided to extend into the block 70 from the side surface 72d, and intersect the side surfaces 72a and 72b to facilitate water drainage from one side of the block 70 to another side of the block 70. In one embodiment, the groove 78b may be formed during casting of the block 70. In another embodiment, the groove 78b may be formed after the block 70 is formed (e.g., by cutting or grinding the block 70). Although only one groove 78b is shown, any number of grooves, having any desired dimension, may also be provided. Further, a groove such as groove 78b may also be provided to intersect end surfaces 74a and 74b.

The post bracket 10 is configured such that the mounting portion 20 can be brought adjacent to the block 70 where it can be subsequently fastened to the block 70 (e.g., using fasteners). In the illustrated embodiment, the first mounting component 22 extends along the end surface 74a of the block 70 when the mounting portion 20 is brought adjacent to the block 70. In one embodiment, the mating surface 22a contacts the end surface 74a of the block 70 when the mounting portion 20 is adjacent to the block 70. Thus, in the illustrated embodiment, the first flange portion 30 extends along a side surface 72a of the block 70 to which the mounting portion 20 is fastened. As exemplarily illustrated, the first flange portion 30 and the first post support portion 40 can extend along side surfaces 72a and 72b, respectively, of the block 70 when the mounting portion 20 is adjacent to the block 70. In one embodiment, the mating surfaces 30a and 40a of the first flange portion 30 and the first post support portion 40 can contact side surfaces 72a and 72b, respectively, of the block 70. In another embodiment, however, one or both of the mating surfaces 30a and 40a may not contact side surfaces 72a and 72b, respectively, of the block 70.

The fasteners fasten the mounting portion 20 to the end surface 74a of the block 70. Although FIGS. 9 and 10 illustrate many fasteners to fasten the mounting portion 20 to the end surface 74a of the block 70, any number of fasteners (e.g., 1, 2, 3, 4, 5, etc.) may be used to fasten the mounting portion 20 to the block 70. In one embodiment, at least one of the fasteners include a device such as a threaded bolt 82 configured to be inserted through a corresponding aperture 26 formed in the first mounting component 22 of the mounting portion 20, and into the block 70. In one embodiment, the block 70 may include cavities 76 extending into the block 70 from the end surface 74a. The cavities 76 may be configured to receive a bolt. In another embodiment, at least one of the fasteners further includes a bolt cup 84 to receive the bolt 82. The bolt cup 84 may be inserted into a corresponding cavity 76 of the block 70 and be configured to expand and press against block 70 (e.g., against sidewalls of the cavity 76) when the bolt 82 is received therein and tightened. Upon pressing against the block 70, the bolt 82 and the post bracket 10 are secured to the block 70.

As shown in FIG. 10, the post 86 can be fastened to the post support portion 40 such that the bottom surface of the post 86 is suspended above side surface 72*d* of the block 70, and can be suspended over the surface on which the block 70 rests. Therefore, if the post 86 is a wooden post, any water absorbed by the post 86 can drip off the bottom of the post 86 to prevent the post 86 from rotting due to water damage.

As exemplarily shown in FIGS. 9 and 10, the end surface 74*a* and side surfaces 72*a* and 72*b* of the block 70 is substantially planar. In other embodiments, however, one or more of the end surface 74*a* and side surfaces 72*a* and 72*b* of the block 70 may include a recess configured to receive at least a portion of the post bracket 10. For example, referring to FIG. 11A, the end surface 74*a* and side surfaces 72*a* and 72*b* of the block 70 may include a recess 71 configured to receive at least a portion of the first mounting component 22, at least a portion of the first flange portion 30 and at least a portion of the first post support portion 40. In another example shown in FIG. 11B, the side surfaces 72*a* and 72*b* of the block 70 may each include a recess 71' configured to receive at least a portion of the first flange portion 30 and at least a portion of the first post support portion 40. In yet another example shown in FIG. 11C, the end surface 74*a* of the block 70 may include a recess 71" configured to receive at least a portion of the first mounting component 22. Although not shown, it will be appreciated that only one of the side surfaces 72*a* and 72*b* of the block may include a recess 71'. Likewise, it will be appreciated that one of the recesses 71' formed in either one of side surfaces 72*a* and 72*b* may be combined with the recess 71" formed in the end surface 74*a* to produce a recess that is a somewhat modified version of recess 71. In one embodiment, the depth of each of the recesses 71, 71' and 71" can be less than the thickness of the first mounting component 22. In another embodiment, however, the depth of each of the recesses 71, 71' and 71" can be greater than or equal to the thickness of each portion of the post bracket 10 which they are configured to receive.

Figure 12A:
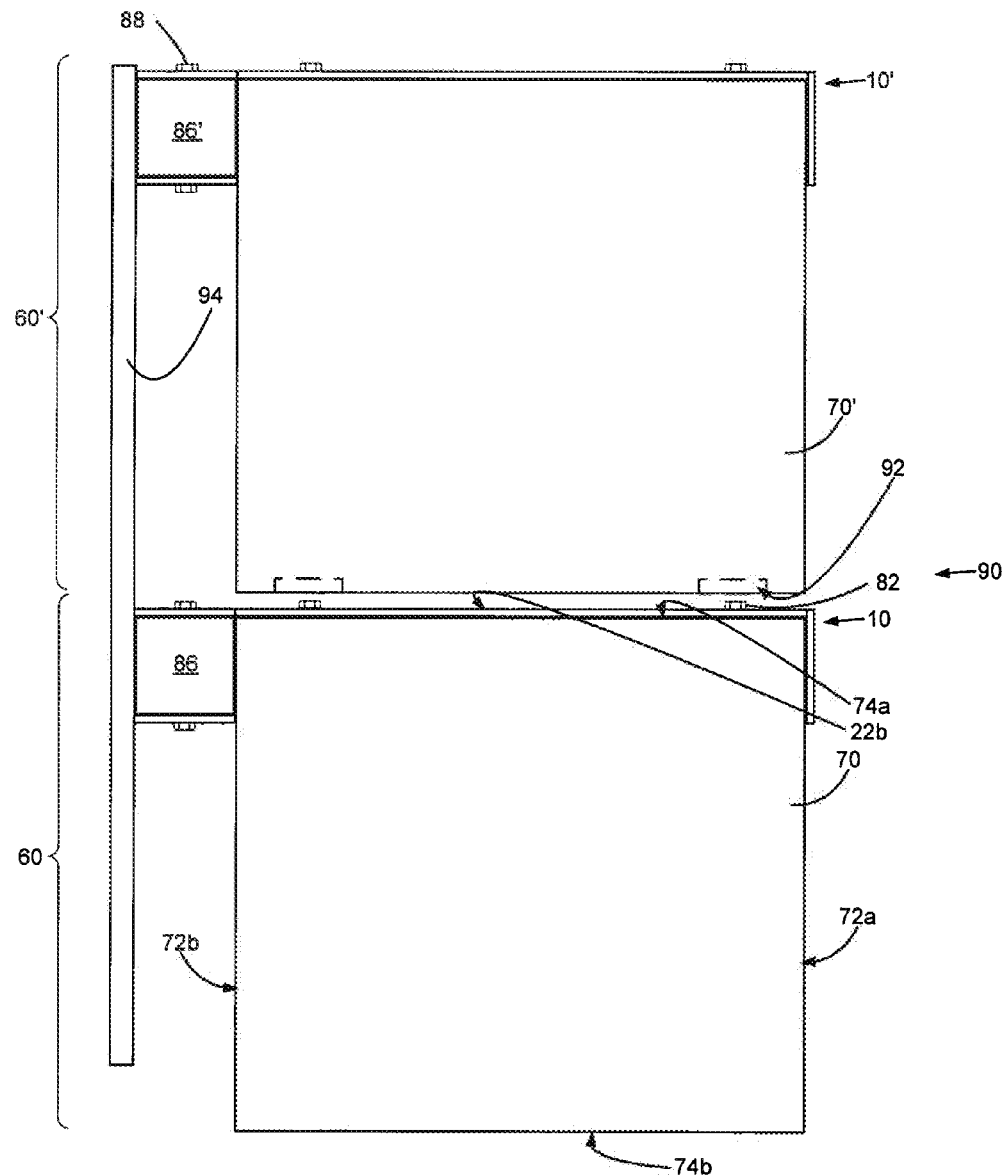
FIGS. 12A and 12B illustrate top plan views of construction systems incorporating multiple post support structures shown in FIGS. 9 and 10, according to embodiments of the invention.
Figure 12B:
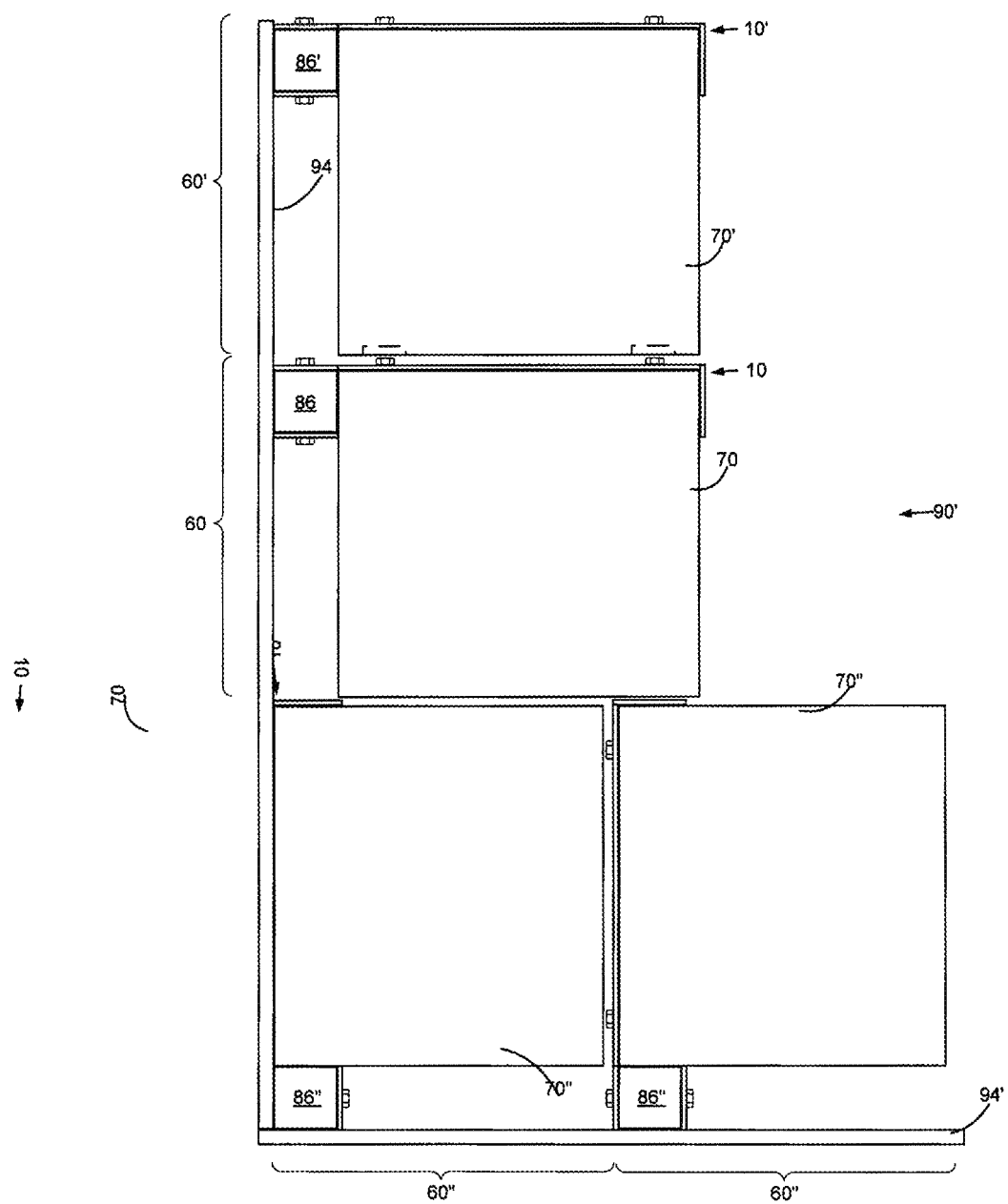

FIGS. 12A and 12B illustrate top plan views of construction systems incorporating multiple post support structures shown in FIGS. 9 and 10, according to some embodiments.

Referring to FIG. 12A, a construction system 90 can generally be characterized as including a block 70 (also referred to in the illustrated embodiment as a "first block 70") and a second block 70', a post bracket 10 (also referred to in the illustrated embodiment as a "first post bracket 10") interposed between the first block 70 and the second block 70', and fasteners. The first block 70 may be configured in the same manner or differently from the second block 70'. Although the first post bracket 10 is shown as exemplarily described with respect to FIGS. 1A and 1B, the first post bracket 10 may be provided in any manner as exemplarily described above.

As exemplarily illustrated, fasteners such as bolts 82 fasten the mounting portion 20 of the first post bracket 10 to the first block 70 as exemplarily described above with respect to FIGS. 9 and 10. In another embodiment, fasteners may fasten the first post bracket 10 to the second block 70' instead of to the first block 70. As such, the first flange portion 30 of the first post bracket 10 can extend along a side surface 72*a* of the first block 70, but mounting portion 20 of the first post bracket 10 is fastened to the second block 70'.

Constructed as exemplarily described above, the combination of the first post bracket 10, the first block 70, and the fasteners fastening the first post bracket 10 to the first block 70 constitute the post support structure 60 exemplarily described above with respect to FIGS. 9 and 10. Accordingly, the second block 70' may be spaced apart from the post support structure 60 as exemplarily illustrated, or may contact the post support structure 60. It will be appreciated that the first post support structure 60 shown in FIG. 12A may be provided as exemplarily discussed above with respect to FIG. 11. By providing the first post support structure 60 as exemplarily discussed above with respect to FIG. 11, the distance between the first block 70 and the second block 70' may be reduced.

In one embodiment, the end surface 74*b* of the second block 70' may include recesses 92 configured to receive at least a portion of a corresponding fastener in the post support structure 60. In another embodiment, more than one fastener, or all fasteners, in the post support structure 60 may be received within a single recess 92. In one embodiment, the depth of each recess 92 may be selected such that the end surface 74*b* of the second block 70' contacts the exterior surface 22*b* of the first post bracket 10. By providing the recesses 92 in the second block 70', the distance between the first block 70 and the second block 70' may be reduced. In another embodiment, the recesses 92 may be configured to receive the mounting portion 20 of the first post bracket 10, thereby further reducing the distance between the first block 70 and the second block 70'. It will be appreciated that the end surface 74*b* of the first block 70 may also include one or more recesses 92 as exemplarily described above. The one or more recesses 92 may be formed during casting of one or both of the first block 70 or the second block 70', of after the block is formed (e.g., by cutting or grinding).

As exemplarily illustrated, the construction system 90 may further include a second post bracket 10' fastened to the second block 70'. Constructed as exemplarily described above, the combination of the second post bracket 10', the second block 70', and the fasteners fastening the second post bracket 10' to the second block 70' may constitute a second post support structure 60'. The second post bracket 10' may be configured in the same manner as, or differently from, the first post bracket 10. Further, although the second post bracket 10' is shown as exemplarily described with respect to FIGS. 1A and 1B, the second post bracket 10' may be provided in any manner as exemplarily described above.

As exemplarily illustrated, the construction system 90 may further include a post 86 (also referred to in the illustrated embodiment as a "first post 86") fastened to the post support portion 40 (also referred to in the illustrated embodiment as a "first post support portion 40") of the first post bracket 10 and a second post 86' fastened to the post support portion (also referred to in the illustrated embodiment as a "second post support portion 40") of the second post bracket 10'. The first post 86 and second post 86' may be formed of a material such as wood, metal, concrete, stone, or the like, or a combination thereof. The first post 86 may be configured the same as, or differently from, the second post 86'. An inter-post connector 94 may be coupled to the first post 86 and the second post 86' (e.g., above the first post bracket 10 and the second post bracket 10') so as to extend between the first post 86 and the second post 86'. The inter-post connector 94 may be formed of a material such as wood, metal, concrete, stone, or the like, or a combination thereof. In one embodiment, the first post 86 and the second post 86' are fence posts, and the inter-post connector 94 is a cross-beam on which fence boards (not shown) may be hung (e.g., via nails, screws, etc.) to construct a fence, as is known in the art. If desired, an additional inter-post connector may be coupled to the first post 86 and the second post 86' (e.g., below the inter-post connector 94) so as to extend between the first post 86 and the second post 86'. The fence boards may be fastened (e.g., via nails, screws, etc.) to the additional inter-post connector to provide additional stability to the fence, as is known in the art. It will be appreciated that any other suitable structure (e.g., a door, a sign, a shelf, a roof, etc.) may be attached to any of the first post 86 or second post 86'. It will also be appreciated that any other suitable structure (e.g., a door, a sign, a shelf, a roof, etc.) may be attached to any inter-post connector coupled to the first post 86 and second post 86'.

In embodiments where one or both of the first post bracket 10 and the second post bracket 10' are configured as exemplarily described above with respect to FIGS. 4-6, each post bracket may be fastened to an additional post 86" that is configured in the same manner as, or differently from, first post 86 or second post 86'. In such embodiments, structures attached to each additional post may be configured in the same manner as, or differently from, structures attached to one or both of the first post 86 and second post 86'.

Although the construction system 90 is illustrated as including only two post support structures, the construction system 90 may include any number of additional post support structures, which are the same as or different from the first post support structure 60 or the second post support structure 60'. The additional post support structures may be arranged so as to provide a construction system extending in along a substantially straight line, along a curved line, or the like or a combination thereof. It will be appreciated that additional post support structures such as post support structures 60" may be provided to form an L-shaped construction system 90', as exemplarily shown in FIG. 12B. In the construction system 90', the additional post support structures 60" may include post brackets 10", blocks 70", and inter-post connector 94'. Although the post brackets 10" are illustrated as being the same as post brackets 10 and 10', it will be appreciated that each of the post brackets 10" may be provided according to any embodiment exemplarily described herein. Although the blocks 70" are illustrated as being the same as post brackets 10 and 10', it will be appreciated that each of the blocks 70" may be provided according to any embodiment exemplarily described herein. The inter-post connector 94' may be configured in the same manner as, or differently from, the inter-post connector 94. Moreover, more post support structures may be added to the construction system such as the construction system 90' shown in FIG. 12B to form any shape.

Figure 13A:
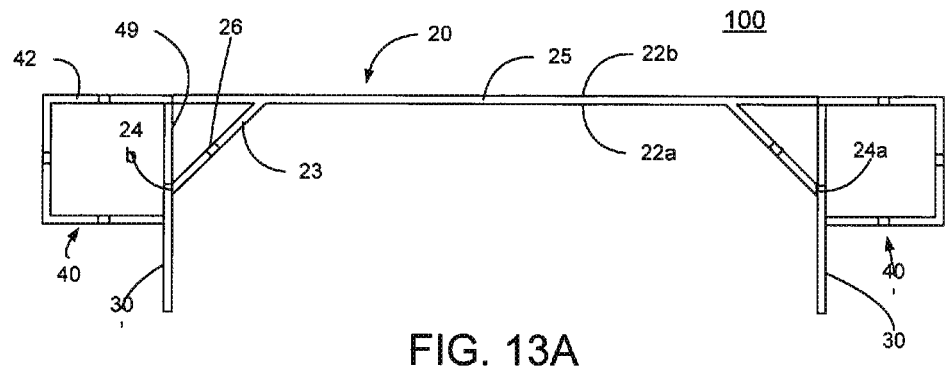
FIG. 13A illustrates a top plan view of a post bracket according to another embodiment of the invention.
Figure 13B:
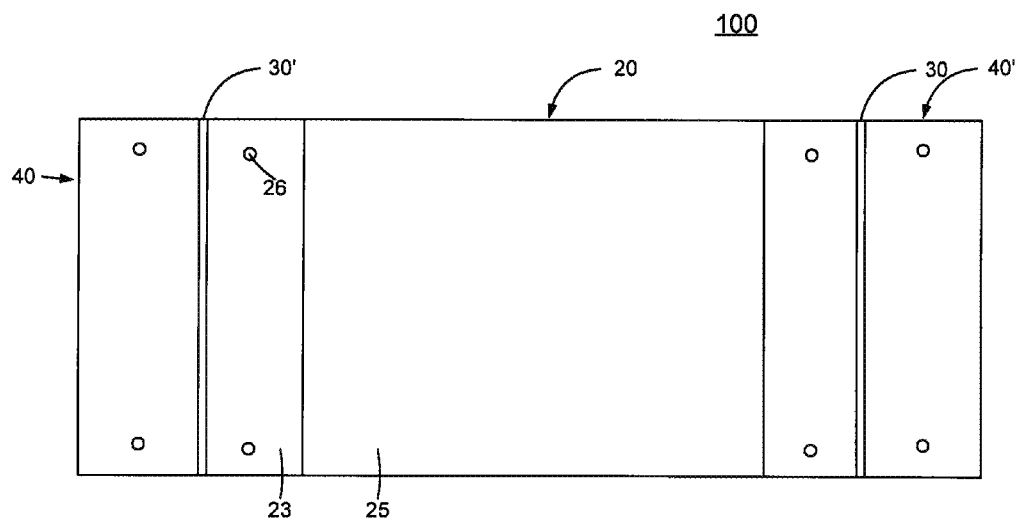
FIG. 13B illustrates a front plan view of the post bracket shown in FIG. 13A.
Figure 14:
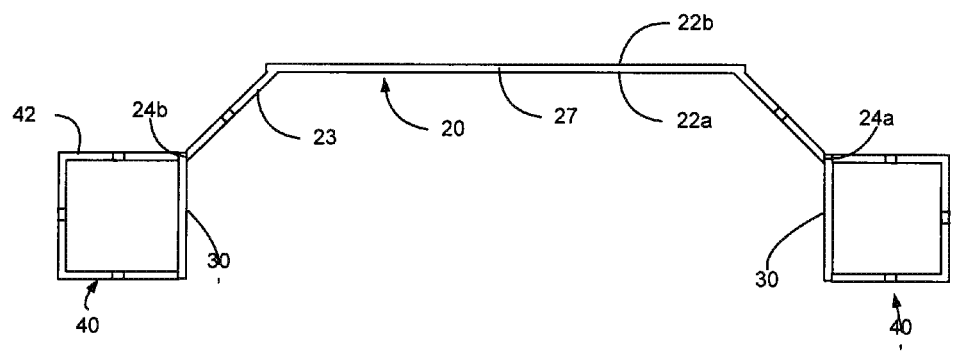
FIG. 14 illustrates a top plan view of a post bracket according to yet another embodiment of the invention.

FIG. 13A illustrates a top plan view of a post bracket according to yet another embodiment. FIG. 13B illustrates a front plan view of the post bracket shown in FIG. 13A. FIG. 14 illustrates a top plan view of post bracket according to still another embodiment.

Referring to FIGS. 13A and 13B, a post bracket 100 may be provided in any manner as exemplarily described above (e.g., as described with respect to FIG. 5), but the mounting portion 20 may include two first mounting components 23 connected together by a second mounting component 25 extending therebetween. The first mounting components 23 define either the aforementioned first edge 24a or the second edge 24b.

Each of the two first mounting components 23 include apertures 26 defined therein, which are each configured to receive a fastener (not shown) for fastening the post bracket 100 to a block. Although FIGS. 13A and 13B illustrate the first mounting components 23 as each including two apertures 26, the first mounting component 23 may have any number of apertures 26 (e.g., 1, 2, 3, 4, 5, etc.) disposed in any type of arrangement. In another embodiment, any one of the two first mounting components 23 need not include any apertures.

As exemplarily illustrated, the second mounting component 25 extends to the first post support portion 40 and the second post support portion 40'. In another embodiment, however, the second mounting component 25 does not extend to one or both of the first post support portion 40 and the second post support portion 40'. For example, the second mounting component 25 may be provided in the same manner as the second mounting component 27 shown in FIG. 14. As exemplarily illustrated, the second mounting component 27 does not include any apertures for receiving fasteners to fasten the post bracket 100 to a block. In another embodiment, however, the second mounting component 27 may include any number of apertures, in any suitable arrangement, for receiving fasteners to fasten the post bracket 100 to a block.

The first post support portion 40 is disposed at the second edge 24b of defined by one of the two first mounting components 23 and the second post support portion 40' is disposed at the first edge 24a of defined by the other of the two first mounting components 23. Each of the first post support portion 40 and the second post support portion 40' may be provided in any manner as exemplarily described above (e.g., as described with respect to FIGS. 1A and 1B). In one embodiment, one or both of the first post support portion 40 and the second post support portion 40' may further include a fourth sleeve portion 49 extending between the first sleeve portion 42 and one of the second flange portion 30' and the first flange portion 30, respectively. When connected to the first sleeve portion 42 and a corresponding one of the second flange portion 30' and the first flange portion 30, the fourth sleeve portion 49 can provide enhanced structural stability to a respective post support portion.

Referring to FIG. 14, a post bracket may be provided in any manner as exemplarily described above with respect to FIGS. 13A and 13B), but the first post support portion 40 and the second post support portion 40' are moved away from the mounting portion 20 such that the first sleeve portion 42 of each of the first post support portion 40 and the second post support portion 40' are connected to respective ones of the second flange portion 30' and the first flange portion 30. By arranging the first post support portion 40 and the second post support portion 40' relative to the mounting portion 20 as shown in FIG. 14, fasteners such as bolts 82 can be accessed with greater ease than when the first post support portion 40 and the second post support portion 40' are arranged relative to the mounting portion 20 as shown in FIG. 13A. Further, the second mounting component 27 extends only between the two first mounting components 23.

Although FIGS. 13A, 13B and 14 describe a post bracket 100 having a first flange portion 30, second flange portion 30', first post support portion 40 and second post support portion 40' provided in the manner exemplarily described with respect to FIG. 5, the post bracket 100 may be provided with one or more of the first flange portion 30 and the second flange portion 30', and one or more of the first post support portion 40 and the second post support portion 40' in any manner as exemplarily described above.

Figure 15:
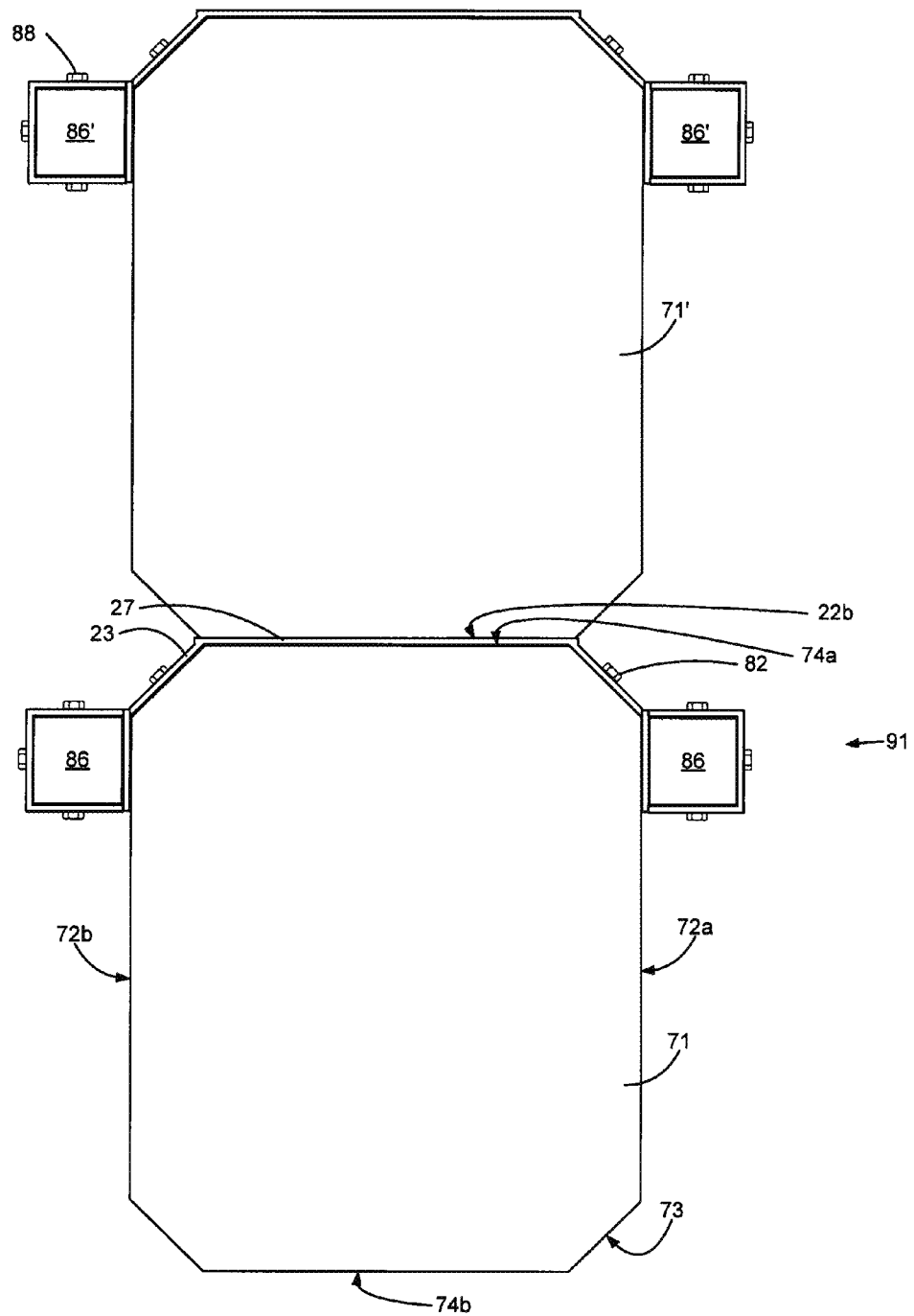
FIG. 15 illustrates a top plan view of a construction system incorporating multiple post support structures shown in FIG. 14, according to embodiments of the invention.

FIG. 15 illustrates a top plan view of a construction system incorporating multiple post support structures shown in FIG. 14, according to one embodiment.

Referring to FIG. 15, a construction system 91 can generally be characterized as including a block 71 (also referred to in the illustrated embodiment as a "first block" 71) and a second block 71', a post bracket 100 (also referred to in the illustrated embodiment as a "first post bracket 100") interposed between the first block 71 and the second block 71', and fasteners such as fasteners 82.

The first block 71 may be configured in the same manner or differently from the second block 71'. As exemplarily illustrated, the first block 75 and the second block 71' further include chamfered surfaces 73. Each chamfered surface 73 may extend between an end surface 74a or 74b and a corresponding side surface 72a, 72b, 72c or 72d. As exemplarily illustrated, a chamfered surface 73 extends between each end surface 74a and 74b and each side surface 72a, 72b, 72c and 72d. In other embodiments, however, a chamfered surface 73 may extend between one or both end surfaces 74a or 74b and one or more corresponding side surfaces 72a, 72b, 72c or 72d.

Although the first post bracket 100 and the second post bracket 100' are each shown as exemplarily described with respect to FIG. 14, the first post bracket 100 and the second post bracket 100' may be provided in any manner as exemplarily described above. Moreover, the first post bracket 100 may be configured in the same manner or differently from the second post bracket 100'.

The post bracket 100 is configured such that the mounting portion 20 can be brought adjacent to the first block 71 where it can be subsequently fastened to the first block 71 (e.g., using fasteners such as bolts 82). In the illustrated embodiment, the first mounting components 23 extend along corresponding chamfered surfaces 73 of the first block 71 when the mounting portion 20 is brought adjacent to the first block 71. When the first mounting components 23 extend along chamfered surfaces 73 of the first block 71, the second mounting component 27 may extend along the end surface 74a of the first block 71.

In one embodiment, the mating surface 22a contacts the chamfered surfaces 73 of the first block 71 when the mounting portion 20 is adjacent to the first block 71. Thus, in the illustrated embodiment, the first flange portion 30 and the second flange portion 30' extend along side surfaces 72a and 72b, respectively, of the first block 71 to which the mounting portion 20 is fastened. As exemplarily illustrated, the first flange portion 30 and the first post support portion 40 can extend along side surfaces 72a and 72b, respectively, of the first block 71 when the mounting portion 20 is adjacent to the first block 71. In one embodiment, the mating surfaces 30a and 30a' of the first flange portion 30 and the second flange portion 30' can contact side surfaces 72a and 72b, respectively, of the first block 71. In another embodiment, however, one or both of the mating surfaces 30a and 30a' may not contact side surfaces 72a and 72b, respectively, of the first block 71.

The foregoing is illustrative of example embodiments of the invention and is not to be construed as limiting thereof. Although a few example embodiments have been described, those skilled in the art will readily appreciate that many modifications are possible without materially departing from the novel teachings and advantages of the invention. Accordingly, all such modifications are intended to be included within the scope of the invention as defined in the following claims.

What is claimed is:

1. A fence post support comprising:
   a support block having a face, a first side, and a second side opposite the first side, the support block further including a groove extending in the support block; and
   a fence post bracket attached to the block support, the fence post bracket formed of a generally planar material having a length, a width, and a thickness, the thickness being relatively thin in comparison to the length and width, the fence post bracket comprising:
   a main body for attaching within the groove of the face of the block support;
   a first end attached to or integral with the main body, the first end shaped to form a sleeve having at least two sides that meet at a right angle, the sleeve being structured to accept a fence post within the sleeve and to support such a fence post adjacent to the first side of the block support in a vertical direction, and the sleeve having apertures through which a fastener may be used to fasten such a fence post to the sleeve.

2. The fence post support according to claim 1, in which the groove extends into the first side of the support block.

3. The fence post support according to claim 1, in which the sleeve has a depth between approximately 6 and 18 inches.

4. The fence post support according to claim 1, in which the sleeve has three or four sides.

5. The fence post support according to claim 1, further comprising:
   a second end opposite the first end and attached to or integral with the main body, the second end structured to attach to a second side of the block support.

6. The fence post support according to claim 1, wherein the main body includes two or more apertures configured to receive a fastener for fastening the fence post bracket to the block support.

7. The fence post support according to claim 1, wherein the main body is rectangular.

8. The fence post support according to claim 1, wherein the sleeve has an open bottom and an open top.

* * * * *